(12) United States Patent
Bernardelle

(10) Patent No.: US 9,522,570 B2
(45) Date of Patent: Dec. 20, 2016

(54) SPOKED WHEEL FOR TUBELESS TIRES

(75) Inventor: Giulio Bernardelle, Schio (IT)

(73) Assignee: IN-MOTION S.R.L., San Martino Buon Albergo (IT)

( * ) Notice: Subject to any disclaimer, the term of this patent is extended or adjusted under 35 U.S.C. 154(b) by 267 days.

(21) Appl. No.: 12/809,803

(22) PCT Filed: Oct. 3, 2008

(86) PCT No.: PCT/IB2008/002621
§ 371 (c)(1),
(2), (4) Date: Jun. 21, 2010

(87) PCT Pub. No.: WO2009/081242
PCT Pub. Date: Jul. 2, 2009

(65) Prior Publication Data
US 2012/0019051 A1 Jan. 26, 2012

(30) Foreign Application Priority Data
Dec. 21, 2007 (IT) .............................. VR2007A0194

(51) Int. Cl.
*B60B 21/06* (2006.01)
*B60B 1/04* (2006.01)

(52) U.S. Cl.
CPC ............. *B60B 21/062* (2013.01); *B60B 1/048* (2013.01); *B60B 21/066* (2013.01); *B60B 21/06* (2013.01); *B60Y 2200/12* (2013.01)

(58) Field of Classification Search
CPC ...... B60B 21/062; B60B 21/066; B60B 1/043; B60B 1/044; B60B 1/045; B60B 1/048
USPC .................... 301/55, 58, 61, 67, 68, 70, 104
See application file for complete search history.

(56) References Cited

U.S. PATENT DOCUMENTS

| 1,259,814 | A | * | 3/1918 | Watson | 301/67 |
| RE14,900 | E | * | 6/1920 | Black | 152/31 |
| 1,532,911 | A | * | 4/1925 | McLain | 152/12 |
| 1,901,629 | A | * | 3/1933 | Burger | 301/13.2 |
| 2,034,360 | A | * | 3/1936 | Sill | 301/95.101 |
| 6,070,948 | A | | 6/2000 | Chen | |
| 6,189,978 | B1 | * | 2/2001 | Lacombe et al. | 301/104 |
| 6,216,344 | B1 | * | 4/2001 | Mercat et al. | 29/894.351 |
| 6,474,746 | B2 | * | 11/2002 | Campagnolo | 301/58 |
| 7,360,847 | B2 | * | 4/2008 | Okajima et al. | 301/61 |
| 2001/0019222 | A1 | | 9/2001 | Campagnolo | |
| 2007/0273197 | A1 | * | 11/2007 | Smith | 301/58 |

FOREIGN PATENT DOCUMENTS

| FR | 2745232 B1 | 8/1997 |
| WO | WO2005072989 A1 | 8/2005 |
| WO | WO2007082762 A2 | 7/2007 |

* cited by examiner

*Primary Examiner* — Kip T Kotter
(74) *Attorney, Agent, or Firm* — Tutunjian & Bitetto, P.C.

(57) ABSTRACT

A spoked wheel for tubeless tires, particularly for motorcycles, cars and similar vehicles includes a rim, a hub, and spokes suitable for fixing the rim to the hub. Each spoke is connected to the rim by a fastening device inserted in two opposite ears located in an inner surface of the rim.

17 Claims, 3 Drawing Sheets

SPOKED WHEEL FOR TUBELESS TIRES

BACKGROUND OF THE INVENTION

The invention relates to a spoked wheel for tubeless tires, also called tubeless, particularly for motorcycles, cars and similar vehicles. Tubeless tires have been preferred for some time now in the motorcycle industry as well, especially for high-performance motorcycles. It is a known fact that tubeless tires have numerous advantages compared to tires with inner tubes.

Tubeless tires are safer and are not subject to bursting, and because they have no inner tube, this cannot be lacerated. In case of a flat tire, they deflate fairly slowly, making it possible to ride the motorcycle as far as a tire-repair shop.

Furthermore, they are not subject to any sliding or rotation of the tire with respect to the rim, which in the case of tires with inner tubes could cause the valve to tear away from the inner tube. For operation and assembly, tubeless tires require an airtight rim with a special seal profile for the tire bead. For this reason, in most cases, cast or pressed rims are used, almost always with rigid spokes. In fact, because, traditionally, a spoked wheel comprises a rim with through holes to fix the spokes using nipples, it is very difficult to seal the hole area where the fixing nipples are fitted.

Alternatively, e.g. in the patent EP-B-O 143 394, rims for spoked wheels have been presented with the spoke fitting seats arranged on the edges of the rim, so as to allow fitting tubeless tires. The rim of the patent EP-B-O 143 394 has considerably thick sides, because it also has to contain the spoke seats, and is therefore heavier than standard type rims. Furthermore, manufacturing the rim is also more difficult with increase in production costs.

Another problem regarding the rims currently in use for spoked wheels, and in particular for off-road, enduro or supermotard motorcycle competitive use, is that of the relevant lack of sturdiness of the rim. In fact, the traditional manufacture of spoked wheels for motorcycles envisages that the rim be made of aluminum alloy by extrusion with subsequent rolling until a round element is obtained that is then closed by welding.

The structure of the rims obtained in this way is not sturdy enough to withstand off-road stresses, and therefore often breaks. On the other hand, spoked wheels are preferred in the off-road sector for their greater elasticity and their ability to withstand the stresses of off-road, enduro, motocross riding, etc.

SUMMARY

One object of the invention is to upgrade spoked wheels for tubeless tires of the known type.

Another object of the invention is to present a spoked wheel for tubeless tires that is particularly strong and lightweight.

Another object of the invention is to present a spoked wheel for tubeless tires that can absorb high stresses and/or hard knocks, and therefore be advantageously used in the off-road motorcycle industry.

In conformity with one aspect of the invention, a spoked wheel for tubeless tires is presented according to the claims, which refer to preferred and advantageous embodiments of the invention.

BRIEF DESCRIPTION OF THE DRAWINGS

The invention can be better understood and implemented with reference to the attached drawings, which illustrate an exemplary and non-limitative form of embodiment, in which:

the FIG. 1 is a partial side perspective view of the spoked wheel according to the invention;

Figure 1:
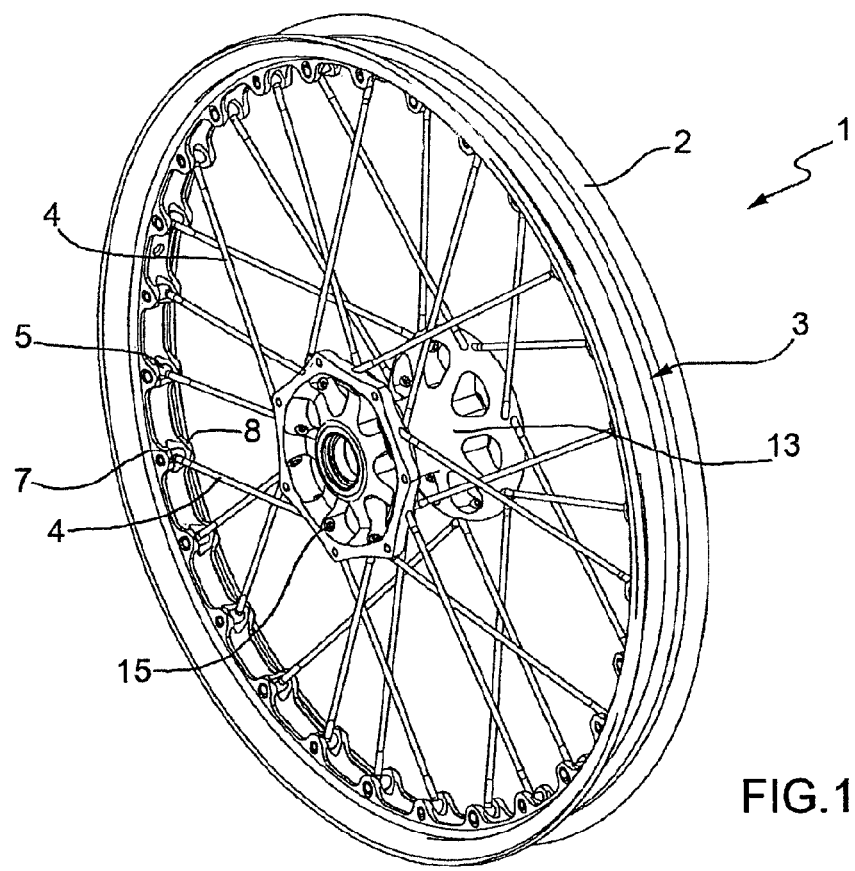
Figure 2:
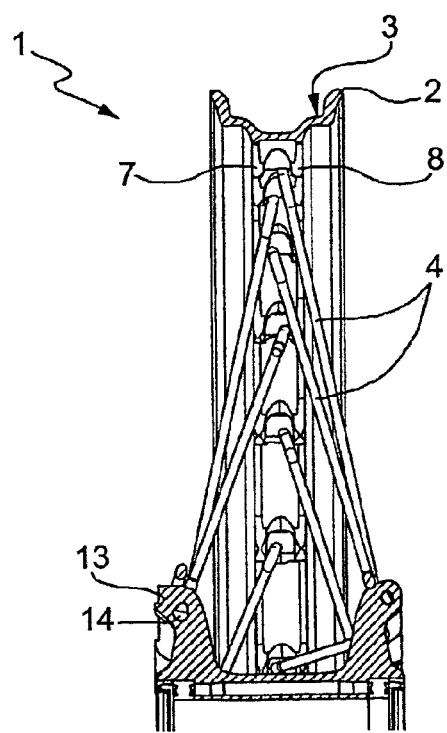
Figure 3:
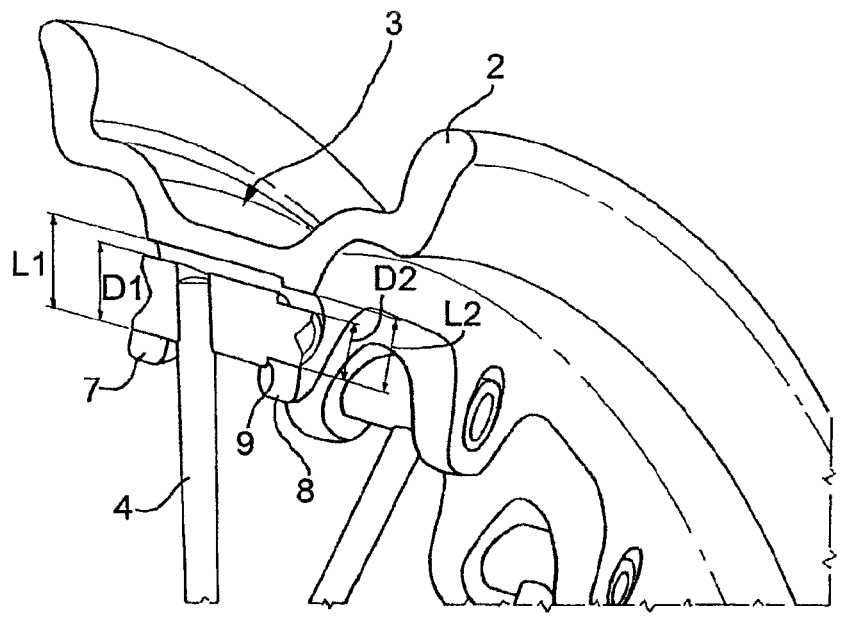
Figure 4:
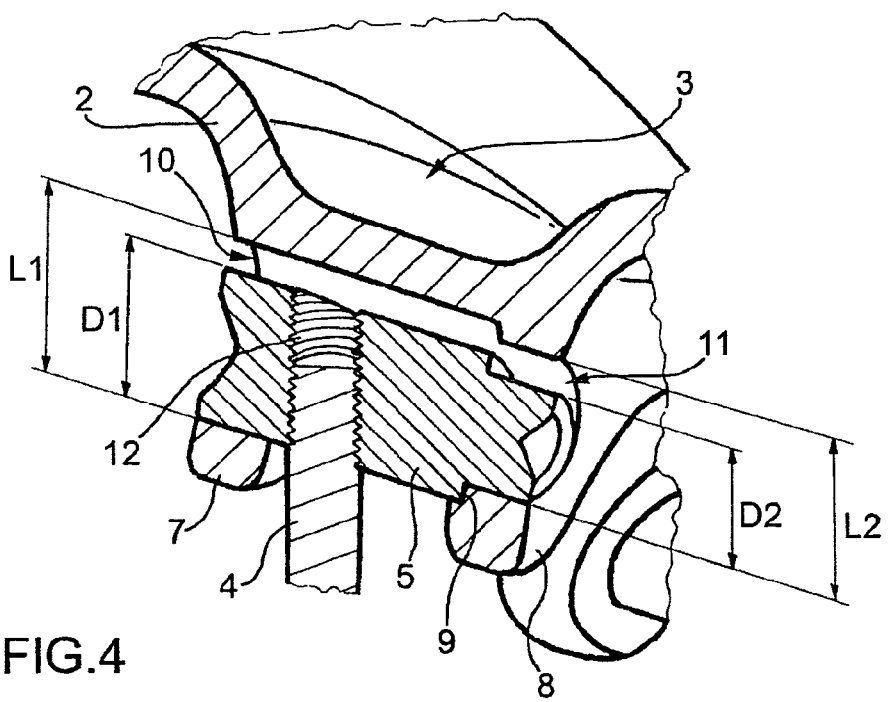
Figure 5:
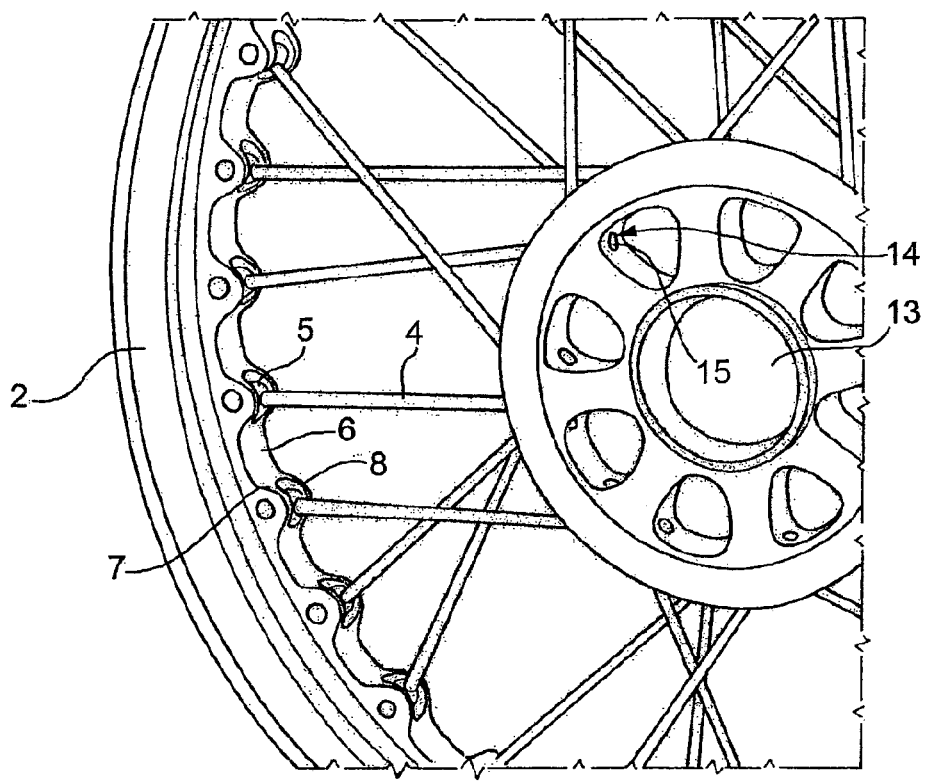
Figure 6:
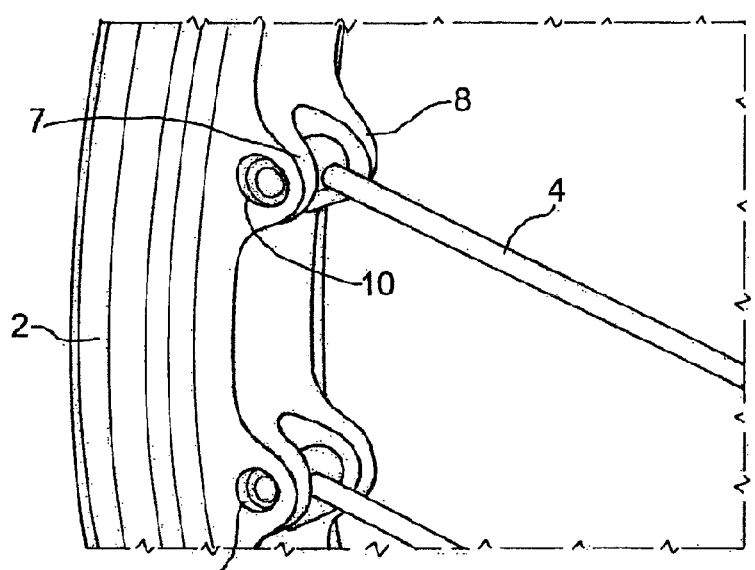

the FIG. 2 is a partial section of the spoked wheel in FIG. 1;

the FIG. 3 shows an enlarged detail of the spoked wheel in the previous figures; and the FIGS. 4, 5 and 6 show other enlarged details of the spoked wheel in the previous figures.

DETAILED DESCRIPTION OF PREFERRED EMBODIMENTS

With reference to the figures, 1 denotes in its entirety a spoked wheel comprising a rim 2 of the type suitable for accommodating a tubeless tire (not shown), a series of spokes 4 and a hub 13, connected together according to methods explained in detail below.

The rim 2 has a channel 3 having a specific profile for fitting the beads of the tire so that a perfect air seal is obtained, including without inner tube. In this respect, it should be noticed that the channel 3 of the rim is totally devoid of holes, in fact, the spokes 4 are connected to the rim 2 by means of fastening means 5 not passing through the channel 3.

The rim 2 has an inner surface 6 opposite the channel 3 on which are obtained a series of ears 7, 8 placed on two circumferences which are in a substantially symmetric position with respect to a centre line plane of the rim 2.

Each of the fastening means 5 is connected to the rim 2 by means of two opposite ears 7, 8 which are in a corresponding and symmetric position on the two circumferences of the inner surface 6.

According to FIGS. 3 and 4, the fastening means comprise a cylindrical part 5, having a shoulder 9 resting on an inner side of one of the ears 7, 8 on the right, or on the left, when the spoke 4 connected to the cylindrical part 5 is tensioned.

More in detail, the cylindrical part 5 comprises two cylindrical portions with different diameters D1, D2, which define the above shoulder 9, which rests on an inner side of the ear, being of smaller diameter. Because the spokes 4 are alternately angled in opposite directions to provide the camber needed to provide the wheel with a certain stiffness, the ears 7, 8 also have holes 10, 11 of different dimensions L1, L2 respectively.

The holes 10, 11 have a slot shape and the dimensions L1, L2 measured in a radial direction are respectively slightly greater than the diameters D1, D2 of the cylindrical part 5. From the FIGS. 3 and 4 it is clear that the cylindrical parts 5 are resting on the lower part of the holes 10, 11, thereby providing the centering of the rim 2 with respect to the hub 13. The purpose of the radial play allowed by the slot shape of the holes 10, 11 is to offset the knocks and the deformations that could affect the wheel, permitting a greater capacity to absorb stresses compared to the constructions of known type. The spoke 4 is fixed to the cylindrical part 5 by means of a threaded hole 12, which is angled to the same extent as the spoke 4, and is substantially perpendicular to the axis of the cylindrical part 5.

It must be noticed that the threaded hole 12 is arranged in the space between two opposite ears 7, 8, and consequently the fixing of the spoke 4 is very reliable and sturdy.

The relative positions and angles of the cylindrical parts 5 with the shoulders 9, the positions of the ears 7, 8 and of the spokes 4 are determined during wheel planning, so as to favor the quick positioning of the rim 2 with respect to the hub 13, without the need for long centering operations.

The FIG. 5 shows the hub 13 with seats 14 for housing the spokes 4 with relevant heads 15. In this case as well, the seats 14 are shown with the same angle the spokes 4 must have to achieve wheel camber.

The spokes 4 have a straight head 15, with a special housing for a tool for tensioning the spokes themselves. The tensioning operation of the spokes 4 is done by rotating these so they can be screwed or unscrewed with respect to the cylindrical part 5.

The cylindrical part 5 can in turn rotate with respect to an axis substantially parallel with that of the wheel 1, allowing a certain settlement of the whole assembly. As a whole, the spokes 4 are perfectly straight and thus provide greater strength as compared to rounded-head spokes. The spokes 4 can be made of any one of the following materials: stainless steel, titanium alloy, aluminum alloy or magnesium alloy with loaded matrix, or in pressable composite materials such as carbon fibers or the like. The construction of the spokes 4 in composite material is made possible precisely because of their straight shape and if necessary, for the threaded part, an inserted metal bushing can be provided. The cylindrical parts 5 can be made of stainless steel or titanium alloy.

Thanks to the fact that the seats 14 in the hub and the threaded holes 12 in the cylindrical parts 5 are already angled to obtain correct wheel camber, and that the cylindrical parts 5 are already arranged for their right position with respect to the rim by means of the shoulder 9, the assembly of the hub 13 with the rim 2 and the spokes 4 is much simpler and quicker compared to the constructions of known type.

According to an advantageous version of the invention, the rim 2 and/or the hub 13 are made of aluminum or magnesium alloy, using the forging or hot pressing forming method.

According to a further version of the invention, the rim 2 and/or the hub 13 can be made of aluminum or magnesium alloy with loaded matrix, or else of pressable composite materials, e.g., carbon fibers and the like. Afterwards, the rim 2 and/or the hub 13 are finished by machining for the removal of shavings, e.g., using numerical control machines. It is thus possible to create the particular geometry that distinguishes the two above component parts. The forming technology by forging is currently the best with regards to the construction of monolithic light alloy wheels, but on spoked wheels it has thus far only been adopted in rare cases and for building the hub only.

Thanks to the construction by forging of the invention, the rim 2 is particularly resistant to the stresses and knocks that occur especially with regards to off-road vehicles, and is therefore the ideal solution for such use, thanks also to the use of the straight spokes 4.

The spokes 4, being straight, are intrinsically stronger and can be made using sturdier and more resistant materials, such as aluminum alloy or magnesium alloy with loaded matrix, or of pressable composite materials, e.g., carbon fibers and the like.

The composite materials for the hub, the spokes and the rim also allow obtaining wheels of very reduced weight.

The invention thus conceived is susceptible to numerous modifications and variations, all of which falling within the scope of the inventive concept. Furthermore all the details can be replaced with others that are technically equivalent. In practice, the materials used, as well as the contingent shapes and dimensions, may be any according to requirements without moving outside the protection scope of the following claims.

The invention claimed is:

1. A spoked wheel for tubeless tires comprising:
a rim comprising a channel for housing a tubeless tire, said rim having an inner surface opposite to the channel;
a hub;
a plurality of spokes for fixing the rim to the hub, wherein the rim comprises a plurality of pairs of ears, the ears of each pair of ears being disposed facing each other and being projected from the inner surface toward the hub in an opposite direction with respect to the channel,
fastening means connects the spokes to the rim, the fastening means connecting each spoke between a corresponding pair of said plurality of pairs of ears, the fastening means comprising at least a cylindrical part having the axis substantially parallel with that of an axis of the wheel, at least the cylindrical part having a threaded hole suitable for housing a respective threaded portion of a spoke, said threaded hole being arranged between the two opposite ears.

2. The spoked wheel according to claim 1, wherein the fastening means comprises at least the cylindrical part having a shoulder resting on an inner side of at least one ear of said pairs of ears, when the spoke connected to the cylindrical part is tensioned.

3. The spoked wheel according to claim 2, wherein positions and angles of the cylindrical part with the shoulders, the positions of the ears and of the spokes are determined during wheel planning to permit an aligned positioning of the rim with respect to the hub.

4. The spoked wheel according to claim 1, wherein the fastening means comprises at least the cylindrical part having two cylindrical portions with different diameters, which define a shoulder.

5. The spoked wheel according to claim 1, wherein said fastening means comprises at least the cylindrical part inserted in holes with a slot shape, said holes being obtained in the ears and being of different dimensions one to another.

6. The spoked wheel according to claim 5, wherein the cylindrical part has cylindrical portions inserted within the slot-shaped holes of the ears having slightly greater dimensions, in a radial direction, than the dimensions of the cylindrical portions, so as to allow play, in a radial direction, between said cylindrical part and said slot-shaped holes.

7. The spoked wheel according to claim 1, wherein said threaded hole is angled to the same extent as the spoke, and is substantially perpendicular to an axis of the cylindrical part.

8. The spoked wheel according to claim 1, wherein the hub comprises seats for housing the spokes, said seats having a same angle as the spokes to achieve wheel camber.

9. The spoked wheel according to claim 1, wherein said spokes are straight and have a head arranged in the hub, wherein the head is rotatable with respect to the cylindrical part for tensioning the spokes themselves.

10. The spoked wheel according to claim 1, wherein said spokes are made of at least one of stainless steel, titanium alloy, aluminum alloy, magnesium alloy with loaded matrix, or a pressable composite material.

11. The spoked wheel according to claim 1, wherein said cylindrical part is made of stainless steel or titanium alloy.

12. The spoked wheel according to claim 1, wherein said rim is made of aluminum alloy or magnesium alloy, using a forging or hot pressing forming method.

13. The spoked wheel according to claim 12, wherein said rim and/or said hub are finished by machining for removal of shavings.

14. The spoked wheel according to claim 1, wherein said rim is made of aluminum alloy or magnesium alloy with loaded matrix, or pressable composite materials.

15. The spoked wheel according to claim 1, wherein said hub is made of aluminum alloy or magnesium alloy, using a forging or hot pressing forming method.

16. The spoked wheel according to claim 1, wherein said hub is made of aluminum alloy or magnesium alloy with loaded matrix, or pressable composite materials.

17. A vehicle comprising at least a spoked wheel according to claim 1.

* * * * *